Oct. 20, 1959  G. R. SCANLON  2,909,362
HEAT EXCHANGER
Filed July 28, 1954
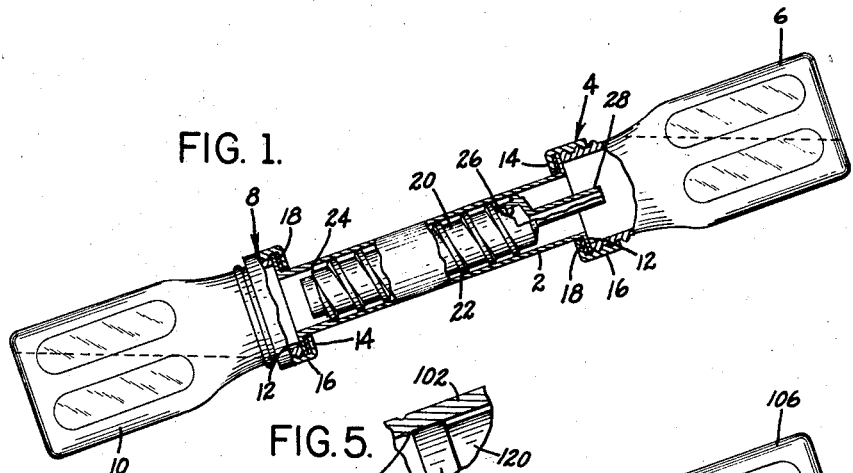
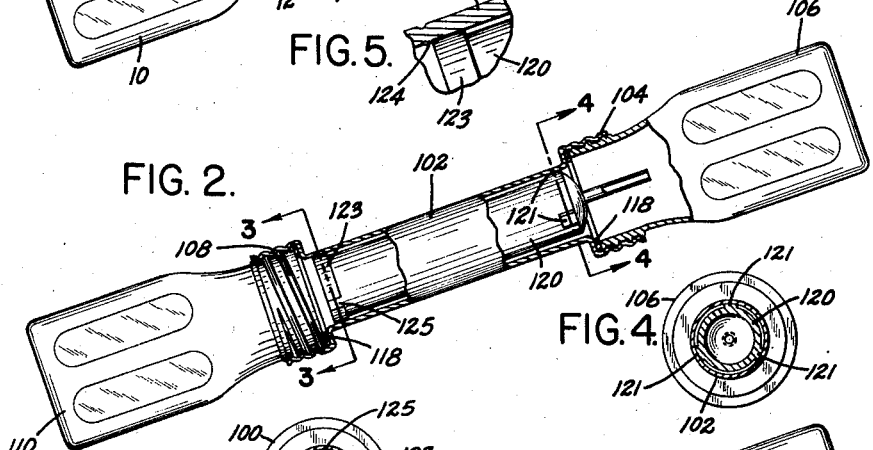
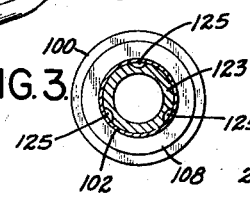
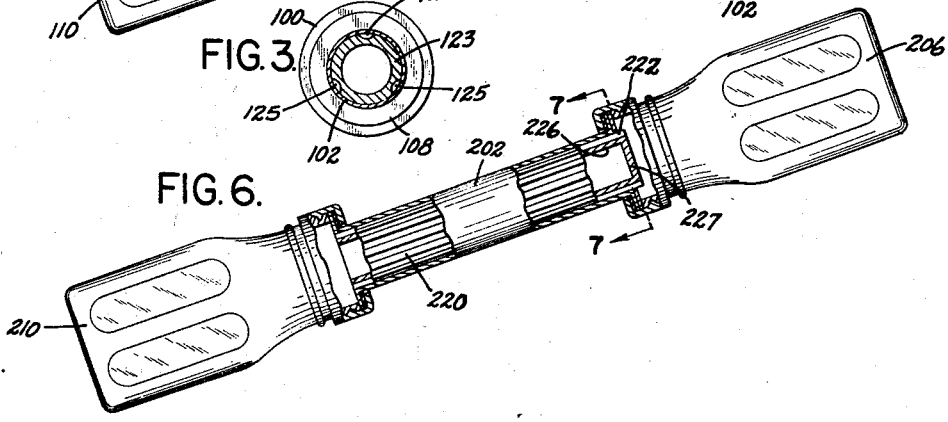
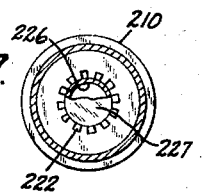
INVENTOR:
GEORGE R. SCANLON
BY
*John F. Schmidt*
ATTORNEY

United States Patent Office 2,909,362
Patented Oct. 20, 1959

2,909,362

HEAT EXCHANGER

George R. Scanlon, Franklin, Pa.

Application July 28, 1954, Serial No. 446,223

7 Claims. (Cl. 257—249)

This invention relates to heat exchangers, especially to heat exchangers of the type used to heat milk for infants.

The problems involved in "heating the baby's bottle" are probably best known to those who have experienced a number of weeks of "two-o'clock feedings"—these being at two a.m., of course. The bottle is taken from the refrigerator, and is thus ice-cold, or nearly so. While one sleepy parent gets the howling baby ready, the other is heating the bottle in a saucepan partly filled with water. Invariably, the bottle is removed from the pan with the milk too cold, or scalding hot. After repeated efforts, the milk is heated, or heated and cooled, to nearly the right temperature, and then cools off while somebody fumbles around finding a nipple that functions. Thereupon the bottle warming process starts over.

Numerous efforts of varying effectiveness have been made to diminish the frustrating process. It is an object of this invention to provide simple means to heat the baby's formula, means that require a minimum of time and bother, and which can be used wherever there is a ready supply of hot water.

In the drawings:

Fig. 1 is a side elevation view, with parts broken away and in section, of one embodiment of my invention;

Fig. 2 is a view showing another embodiment of the invention;

Fig. 3 is a view in section on line 3—3 of Fig. 2;

Fig. 4 is a view in section on line 4—4 of Fig. 2;

Fig. 5 is an enlarged detail view of that portion of Fig. 2 through which line 3—3 passes;

Fig. 6 is a view showing a third embodiment of the invention; and

Fig. 7 is a view in section on line 7—7 of Fig. 6.

In the embodiment of Fig. 1, an elongated outer conduit 2, preferably made of a good heat conductor such as aluminum, is provided at one end with means 4 to connect with a container of liquid to be treated—here shown as a nursing bottle 6, having the desired quantity of formula to be heated. At its other end, conduit 2 is provided with another such means 8, with which is connected a bottle 10.

In this embodiment, conduit 2 is outwardly flanged at its ends as shown at 12, 12. The flange 14 of an inwardly flanged threaded member 16 fits over the ends of conduit 2. Between each pair of flanges 12, 14 there is preferably disposed a gasket 18 of any suitable material.

A member 20 is provided inside the conduit 2 and forms means to form therewith a flow path for liquid to be treated—in this case, the formula to be warmed. In the embodiment of Fig. 1, the means 20 is shown as a member smaller than the inside of conduit 2, and having means 22 on its surface to provide a helical flow path. The bore of conduit 2 is preferably stepped to provide a shoulder 24 against which the end of helix 22 abuts to locate the means 20.

I provide means to conduct air from bottle 10 to bottle 6 while formula is flowing the other way, this air conducting means forming a part of the member 20—its bore 26—and including also a conduit 28 smaller than bore 26, in communication with bore 26, and at one end of member 20. Preferably, conduit 28 is at the upper end, extending toward the supply bottle 6.

In the embodiment of Fig. 2, the outer conduit 102 is similar to conduit 2, but has ends 104 and 108 formed integral with it. In this embodiment, the gaskets 118 engage the ends of the nursing bottles 106 and 110. The upper end (adjacent supply bottle 106) of member 120 is provided with three small projections 121 to space the member 120 from the bore of conduit 102.

At its other end, member 120 is provided with an interrupted collar 123, the "interruptions" comprising three relieved places 125 for the passage of formula. Thus, the flow of formula at the receiving or empty bottle end is considerably restricted, holding formula in the annular passage between member 120 and the bore of conduit 102 and exposing it to the heating effect of water flowing over the outside of conduit 102.

As is best seen in Fig. 5, conduit 102 may be, and preferably is, inwardly dented to provide a stop 124 to engage collar 123. To avoid having one stop pass through a recess 125, two stops 124 may be provided, circumferentially spaced by a distance greater or less than the distance between recesses 125 to insure that at least one stop will always engage the collar.

In the embodiment of Fig. 6, conduit 202 is the same as conduit 2, Fig. 1. Member 220 is provided with spline-like ridges 222 which space the member 220 from the bore of conduit 202. Member 220 is shown as being hollow, and having a bore 226 which is closed at its upper end by an end wall 227. In this embodiment, the means to conduct air from bottle 210 to bottle 206 may be one or more passages between splines 222—probably the uppermost such passages—while formula flows the other way.

Operation

In use, an empty bottle 10 is secured to end 8 and a bottle containing formula to end 4. The device is held under running hot water, with bottle 6 a little higher than bottle 10. Formula flows in a thin stream through the annular space and is quickly heated by the hot water flowing over the outside of conduit 2. Air flows meanwhile through bore 26 and conduit 28 from bottle 10 to bottle 6. The operation of the embodiments of Figs. 2 and 6 will be readily understood from the foregoing because of the similarity of the structures.

The member (or means) 20, or its counterpart 120 or 220, is easily removed from its outer conduit for cleaning and sterilizing.

It will be obvious that, if a single pass through my heat exchanger does not sufficiently warm the formula, it may be passed through again, or experience will indicate that bottle 6 should not be held quite so high, thus slowing down the flow of formula and exposing it a longer time to the hot water.

It is appreciated that not all nursing bottles will fit the ends 4 and 8. To overcome this difficulty, suitable adapters can be provided. These form no part of this invention, and are thus not shown here.

I claim:

1. A heat exchanger adapted to warm the contents of an infant nursing bottle by transferring the same to a second nursing bottle comprising in combination: an elongated outer conduit; means at one end of the conduit to receive the first nursing bottle; means at the other end of the conduit to receive the second nursing bottle, thereby forming a unitary structure defining a closed fluid chamber including the interior of the bottles and the first means; and means inside the outer conduit to form with said conduit a flow path for liquid from the first bottle to the second bottle.

2. A heat exchanger as in claim 1, and means at one end of the flow-path forming means to restrict fluid flow at said one end.

3. A heat exchanger comprising an elongated outer conduit, means at one end of the conduit to connect with a container of liquid to be treated, means at the other end of the conduit to connect with a container to receive treated liquid, means inside the outer conduit to form with said conduit a flow path for liquid from the first-named container to the second-named container, and means at least a part of the last-named means to conduct air from the second-named container to the first-named container while liquid is flowing the other way.

4. A heat exchanger as in claim 3, and means at one end of the flow-path forming means to restrict fluid flow at said one end.

5. A heat exchanger as in claim 4, in which the air conducting means includes a bore in the third-named means and a conduit smaller than said bore in communication therewith and at one end of the third-named means and extending toward the first-named container.

6. A heat exchanger as in claim 3, in which the air conducting means includes a bore in the third-named means and a conduit smaller than said bore in communication therewith and at one end of the third-named means and extending toward the first-named container.

7. A heat exchanger as in claim 3, in which the air conducting means includes a bore in the third-named means.

References Cited in the file of this patent

UNITED STATES PATENTS

| 108,318 | Bigelow | Oct. 18, 1870 |
| 935,060 | Rose | Sept. 28, 1909 |
| 1,727,822 | Hagstedt | Sept. 10, 1929 |
| 2,060,519 | Mouromtseff et al. | Nov. 10, 1936 |
| 2,064,246 | Dmitrevskij et al. | Dec. 15, 1936 |